April 21, 1959 P. E. REEVES 2,883,526

SUBSCRIPTION TELEVISION CONTROL CIRCUIT

Filed March 11, 1953 3 Sheets-Sheet 1

PIERCE E. REEVES
*INVENTOR.*

BY Francis W. Crotty

HIS ATTORNEY.

April 21, 1959 P. E. REEVES 2,883,526
SUBSCRIPTION TELEVISION CONTROL CIRCUIT
Filed March 11, 1953 3 Sheets-Sheet 2

PIERCE E. REEVES
*INVENTOR.*

BY Francis W. Crotty

HIS ATTORNEY.

SUBSCRIPTION TELEVISION CONTROL CIRCUIT

Filed March 11, 1953 3 Sheets-Sheet 3

PIERCE E. REEVES
*INVENTOR.*

BY Francis W. Crotty

HIS ATTORNEY.

United States Patent Office 2,883,526

Patented Apr. 21, 1959

2,883,526

SUBSCRIPTION TELEVISION CONTROL CIRCUIT

Pierce E. Reeves, Lynwood, Calif., assignor to Zenith Radio Corporation, a corporation of Delaware Application March 11, 1953, Serial No. 341,681

6 Claims. (Cl. 250—27)

This invention relates to subscription television systems and more particularly to an improved control circuit for actuating the encoding mechanism utilized in such television systems. This application is a continuation-in-part of copending application Serial No. 79,432, filed March 3, 1949, and issued March 24, 1953 as Patent 2,632,799, under the names of Albert Cotsworth, Richard O. Gray and Pierce E. Reeves, and assigned to the present assignee.

Patent 2,547,598, issued April 3, 1951, in the name of Erwin M. Roschke, and assigned to the present assignee, discloses and claims a subscription television system in which a coded television signal is transmitted to subscriber receivers and a key signal indicating the coding schedule of the television signal is made available at such receivers, for example by distribution over a line circuit, to enable such receivers to decode and utilize the coded television signal. In the Roschke system, coding of the television signal is accomplished by coding apparatus which effects an alteration in the timing between the video components and the synchronizing components during spaced operating intervals, the times of occurrence of these intervals being indicated to subscriber receivers by means of the key signal. As pointed out in that patent, it is desirable that the timing alterations of the video components occur during retrace intervals to preclude any possibility of distortion in the television signal which might arise should these alterations occur during trace intervals. Moreover, it is desirable that the bursts of key signal supplied over the line circuit precede the actual timing changes by a selected amount so that slight delays suffered by the key signal in the line circuit will have no adverse effect on the coincident operation of the coding apparatus at the transmitter in respect of the decoding apparatus at the various receivers.

In order that mode changes in the television signal may occur during retrace intervals and in order that the key-signal bursts may precede these changes, the system of the aforementioned Roschke patent provides that the key-signal generator at the transmitter be turned on during random periods beginning and ending during field-retrace intervals, a burst of key signal appearing on the line circuit each time the key-signal generator is turned on. Each burst of key signal is applied to a control circuit at the transmitter conjointly with vertical-synchronizing pulses, and the control circuit actuates the coding apparatus during spaced intervals determined by the key signal bursts but initiated and terminated during the field-retrace intervals following the initiation and termination of each such burst. The coding apparatus is coupled into the scanning system of the picture-converting device and causes an alteration in the scanning of the device during the spaced intervals determined by the control circuit to effect coding of the television signal. Similar apparatus is included in each subscriber receiver to effect a compensating change in the scansion of the receiver reproducing device during spaced intervals commencing and terminating during the field-retrace intervals following the initiation and termination of each key-signal burst received over the line circuit.

It is an object of the present invention to provide an improved control circuit which may be utilized in the described Roschke system or in the system of the aforementioned copending Cotsworth et al. application for actuating the encoding mechanism at the transmitter and/or at the subscriber receivers.

It is another object of the invention to provide in a subscription television system an improved control circuit for reversing the polarity of applied periodic signal components during a first group of spaced time intervals and for translating said periodic components with unchanged polarity during a second group of spaced time intervals, as determined by an applied control signal.

It is a further object of the present invention to provide an improved control system for actuating the encoding mechanism of a subscription television system in response to the conjoint application of a key signal representing the coding schedule of a television signal and synchronizing pulses representing a timing characteristic of the system.

A control circuit, constructed in accordance with the invention, comprises a pair of common input terminals and a common load circuit. A first signal-translating channel couples the input terminals to the common load circuit. A second signal-translating channel, including a series-connected phase-inverting amplifier, couples the input terminals to the common load circuit and has an amplification different than that of the first channel. There is a control signal source for providing a control signal having a series of components representing a first group of intervening time intervals. Means are provided for coupling the control signal source only to the second channel for applying the control signal to the phase-inverting amplifier to render the second channel conductive during one of the groups of time intervals and non-conductive during the other group of time intervals. A pulse signal source provides a plurality of signal pulses, only some of which occur in time coincidence with the components of the control signal. Finally, the invention comprises means coupling the pulse signal source to the input terminals for applying the signal pulses simultaneously in like phase to both of the channels to develop in the load circuit an output signal having pulse components of one polarity in response to coincidence of components of the control signal and the signal pulses and of opposite polarity in response to the presence of the signal pulses alone.

The features of this invention which are believed to be new are set forth with particularity in the appended claims. The invention, together with further objects and advantages thereof, may best be understood, however, by reference to the following description in conjunction with the accompanying drawings, in which:

Figure 1:
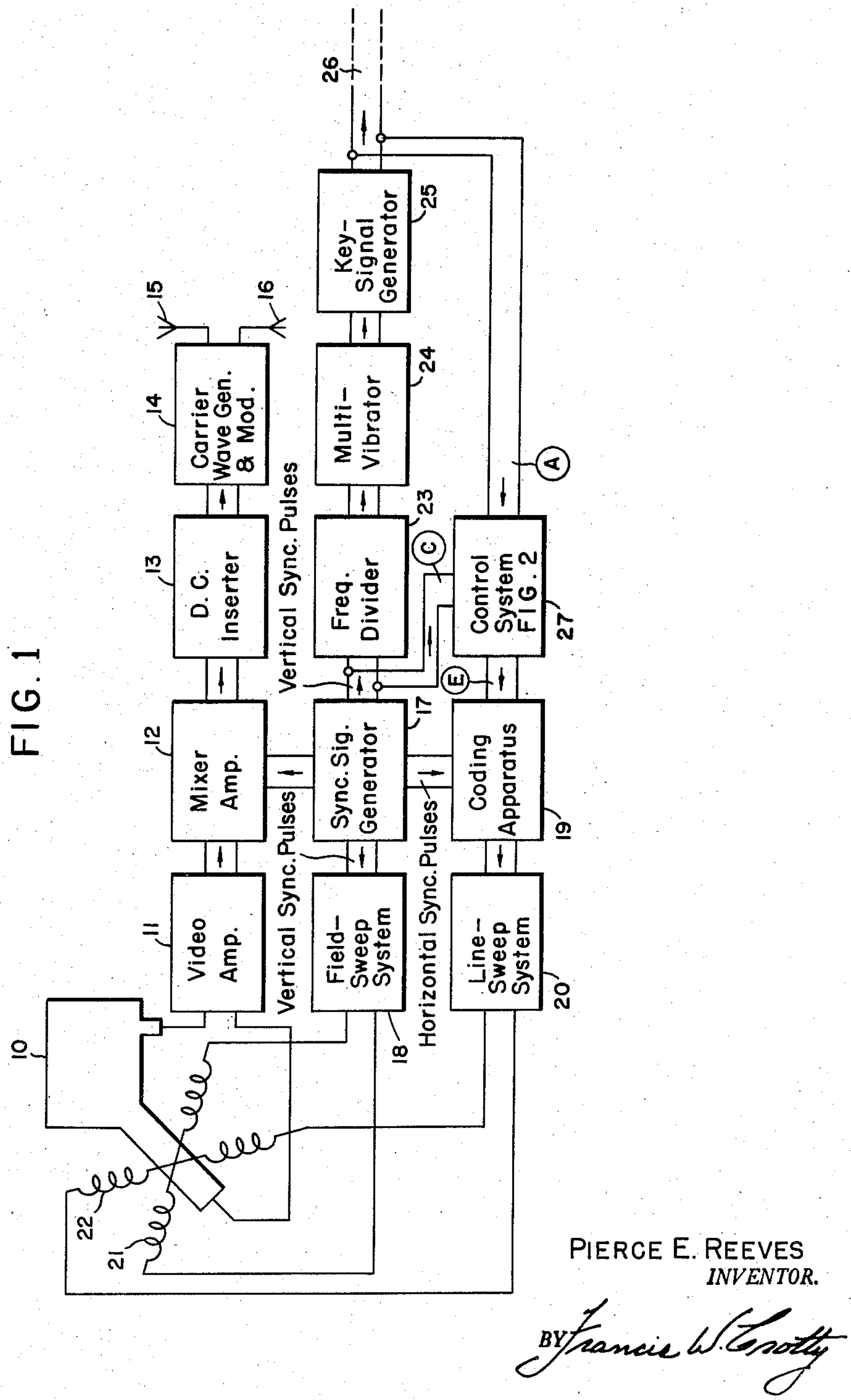
Figure 1 is a block diagram of a subscription television transmitter similar to that disclosed in the aforementioned Roschke patent and incorporating a control circuit which may be constructed in accordance with the invention.

The transmitter of Figure 1 includes a picture-converting device 10 of the cathode-ray type which may be an iconoscope, image orthicon, or the like. Device 10 is connected to a video ampliler 11 of one or more stages which, in turn, is connected to a mixer amplifier 12. The output terminals of mixer 12 are connected through a direct-current inserter 13 to a carrier-wave generator and modulator 14 having output terminals coupled to a suitable antenna 15, 16.

The transmitter further includes a synchronizing-signal generator 17 which supplies horizontal- and vertical-synchronizing pulses, equalizing pulses and associated pedestals to mixer amplifier 12. Generator 17 is also connected to a field-sweep system 18 and through coding apparatus 19 to a line-sweep system 20, supplying vertical-synchronizing pulses to the field-sweep system and horizontal-synchronizing pulses through the coding apparatus to the line-sweep system. The output terminals of sweep systems 18, 20 are connected respectively to field-deflection elements 21 and line-deflection elements 22 associated with device 10.

Synchronizing-signal generator 17 also supplies vertical-synchronizing pulses to a frequency divider 23 which may be of the random type disclosed and claimed in Patent 2,588,413, issued March 11, 1952, to Erwin M. Roschke, and assigned to the present assignee. The output terminals of frequency divider 23 are connected to a multivibrator 24 which may be of the well-known Eccles-Jordan type; that is, the multivibrator has two stable operating conditions and is triggered between these conditions by succeeding pulses from the frequency divider. The multivibrator is connected to a key-signal generator 25 which, in turn, is connected to a line circuit 26 and to one pair of input terminals of a control system 27, the control system having a further pair of input terminals connected to generator 17 to derive vertical synchronizing pulses therefrom and having output terminals connected to coding apparatus 19. Line circuit 26 may extend through suitable central station equipment to a plurality of subscriber receivers (not shown).

In operation, picture-converting device 10 develops a video signal, representing a subject scanned by the device, which signal is amplified in video amplifier 11 and applied to mixer 12 wherein it is mixed with the usual synchronizing and pedestal components from generator 17 to produce a composite television signal at its output terminals. The television signal is appropriately adjusted as to background level in unit 13, modulated on a picture carrier in modulator 14 and radiated to subscriber receivers over antenna 15, 16. As previously mentioned, coding of the television signal may be accomplished by varying during spaced intervals the timing of the video components relative to the synchronizing components. This is effected by coding apparatus 19 which, upon actuation by control system 27, delays by a selected amount the timing of the horizontal-synchronizing components applied to line-sweep system 20. This alters the timing of the line scansion of device 10 relative to the horizontal-synchronizing pulses supplied to mixer 12 from generator 17 during these intervals, and the television signal may be considered effectively coded since such a signal may not be intelligibly reproduced by standard commercial television receivers, the image reproduced by such receivers being characterized by a random lateral displacement or "jitter" occasioned by the variation in the relation between video and synchronizing components.

The spaced operating intervals during which coding apparatus 19 is actuated are determined in the following fashion. Frequency divider 23 produces pulses which occur in time coincidence with randomly selected vertical-synchronizing pulses. The successive pulses from frequency divider 23 alternately trigger multivibrator 24 between its stable operating conditions, actuating key-signal generator 25 only during intervals when it is in a predetermined one of its operating conditions. Each time the key-signal generator is actuated, it delivers a burst of key signal to line circuit 26 for distribution to subscriber receivers. Since the multivibrator is actuated by pulses occurring in time coincidence with vertical-synchronizing pulses, each burst of key signal is initiated and terminated during field-retrace intervals.

The bursts of key signal are applied to control system 27. This system, which also receives vertical-synchronizing pulses from generator 17, develops an actuating or coding signal for coding apparatus 19, this actuating signal having pulse components initiated and terminated during the field-retrace intervals immediately following the commencement and termination of each burst of key signal. For the duration of each such pulse component of the actuating signal, coding apparatus 19 imparts a predetermined delay to the horizontal-synchronizing pulses applied to line-sweep system 20 to effect coding of the television signal as previously explained.

Coding apparatus 19, therefore, changes the mode of operation of the transmitter during spaced time intervals in response to actuation by control system 27. Bursts of key signal are delivered to line circuit 26 indicating the times of actuation of coding apparatus 19, but the actual operation of the coding apparatus takes place during the field-retrace intervals immediately following the initiation and termination of each burst. Therefore, the bursts of key signal on line circuit 26 precede the actual mode changes at the transmitter by a time interval corresponding substantially to a field-trace interval so that slight delays of the key signal in the line circuit do not adversely affect the operation of the system. Moreover, mode changes at the transmitter occur only during field-retrace intervals and distortion that might otherwise arise in the television signal should such changes occur during trace intervals is therefore precluded.

Figure 2:
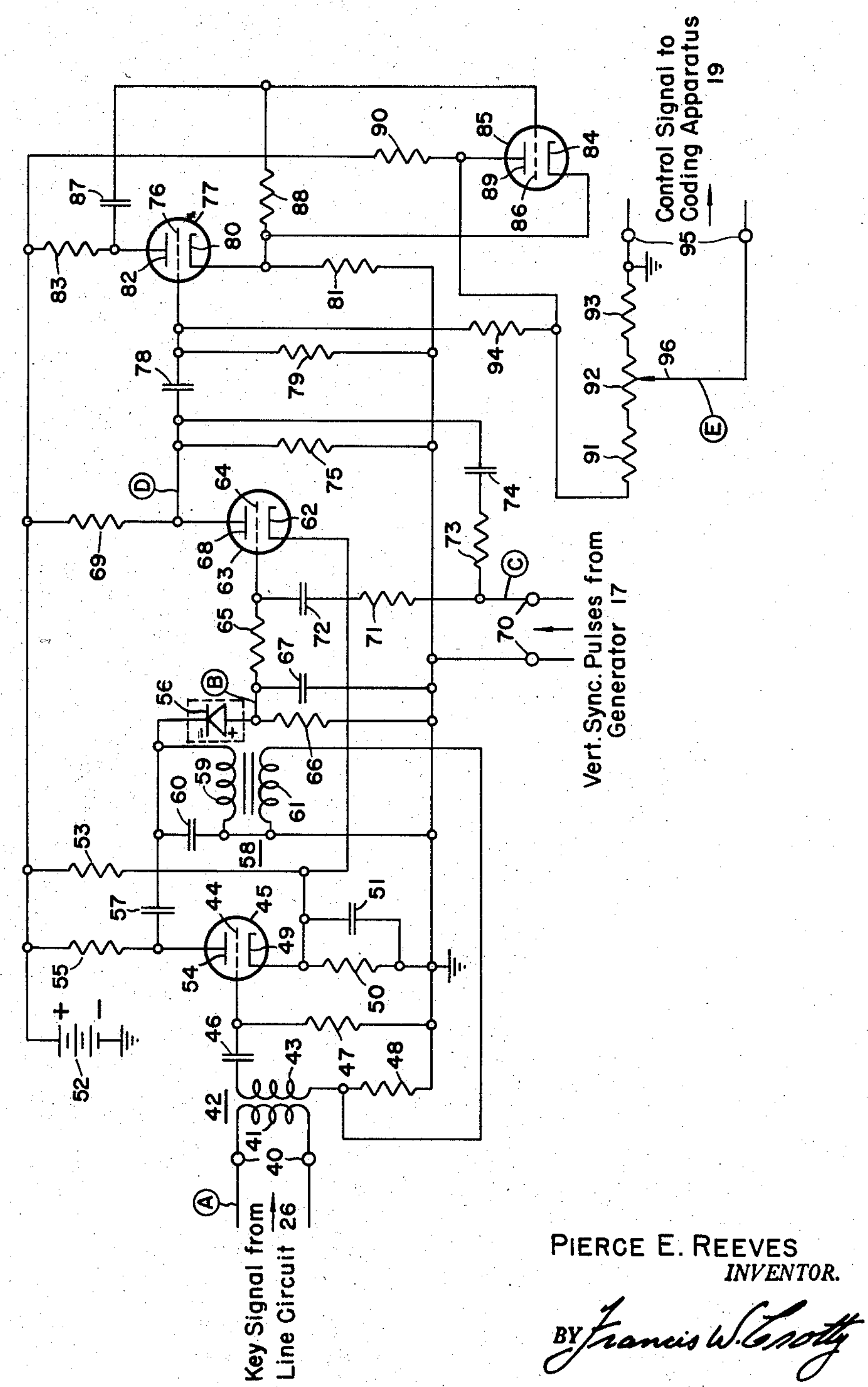
Figure 2 is a detailed schematic circuit diagram of a portion of the transmitter of Figure 1, including an embodiment of the invention.

The arrangement of control system 27 in accordance with the present invention is shown in detail in Figure 2. The control system has a pair of input terminals 40 connected to line circuit 26 to obtain the key signal from generator 25. These input terminals are also connected to the primary winding 41 of a coupling transformer 42. One terminal of the secondary winding 43 of transformer 42 is coupled to the control electrode 44 of an electron-discharge device 45 through a coupling capacitor 46, this control electrode being connected to ground through a grid-leak resistor 47. The other terminal of the secondary winding is connected to ground via a resistor 48. The cathode 49 of device 45 is connected to ground through a biasing resistor 50, this resistor being shunted by a capacitor 51. Cathode 49 is further connected to the positive terminal of a source of unidirectional operating potential 52 through a resistor 53. The anode 54 of device 45 is connected to the positive terminal of source 52 through a load resistor 55, and this anode is coupled to one side of a rectifying device 56 through a capacitor 57. Regeneration is provided for the circuit of device 45 by means of a transformer 58. One terminal of the primary winding 59 of transformer 58 is directly connected to the common junction of capacitor 57 and rectifying device 56, and the other terminal of this winding is coupled to this common junction through a capacitor 60. One terminal of the secondary winding 61 of transformer 58 is connected to ground, and the other terminal of this winding is connected to the common junction of resistor 48 and secondary winding 43. Cathode 49 of discharge device 45 is connected to the cathode 62 of an electron-discharge device 63 herein referred to as a control device. The signal grid or control electrode 64 of device 63 is coupled to rectifying device 56 by means of a resistor 65. The rectifying device is also connected to ground by means of a resistor 66 connected to the common junction of device 56 and resistor 65, resistor 66 being shunted by a capacitor 67. The anode 68 of control device 63 is connected to the positive terminal of source 52 through a load resistor 69.

A pair of input terminals 70 is provided for connecting generator 17 to the control system. One terminal is connected to ground while the other is coupled to signal grid 64 through a series-connected resistor 71 and a capacitor 72. The ungrounded terminal is also connected to anode 68 through a series-connected resistor 73 and a capacitor 74, a resistor 75 being connected between anode 68 and ground.

The anode of control device 63 is coupled to the control electrode 76 of an electron-discharge device 77 through a capacitor 78, this control electrode being connected to ground through a grid-leak resistor 79. The cathode 80 of device 77 is connected to ground through a biasing resistor 81, and the anode 82 of this device is connected to the positive terminal of source 52 through a load resistor 83. Cathode 80 is also connected to the cathode 84 of an electron-discharge device 85, and the anode 82 of device 77 is coupled to the control electrode 86 of device 85 through a coupling capacitor 87, control electrode 86 being connected to cathode 80 through a resistor 88. The anode 89 of device 85 is connected to the positive terminal of source 52 through a load resistor 90, and this anode is connected to ground through series-connected resistors 91, 92 and 93. The junction of anode 89 and resistor 91 is connected to control electrode 76 of device 77 through a balancing resistor 94. One of the output terminals 95 is connected to ground and the other is connected to a movable tap 96 associated with resistor 92. Devices 77 and 85 are so cross-connected that they constitute a well-known trigger circuit or multivibrator which has two operating conditions and is actuated from one operating condition to the other in response to applied pulses of opposite polarity.

Thus, there are provided a first channel, including elements 73 and 74, and a second channel, including elements 71, 72 and a phase-inverting amplifier 63, between signal pulse source 70 and utilization device 77, 85. The first channel is rendered conductive only during spaced intervals determined by the control signal developed across resistor 66, while the second channel is continuously conductive to the applied pulses from terminal 70.

Figure 3:
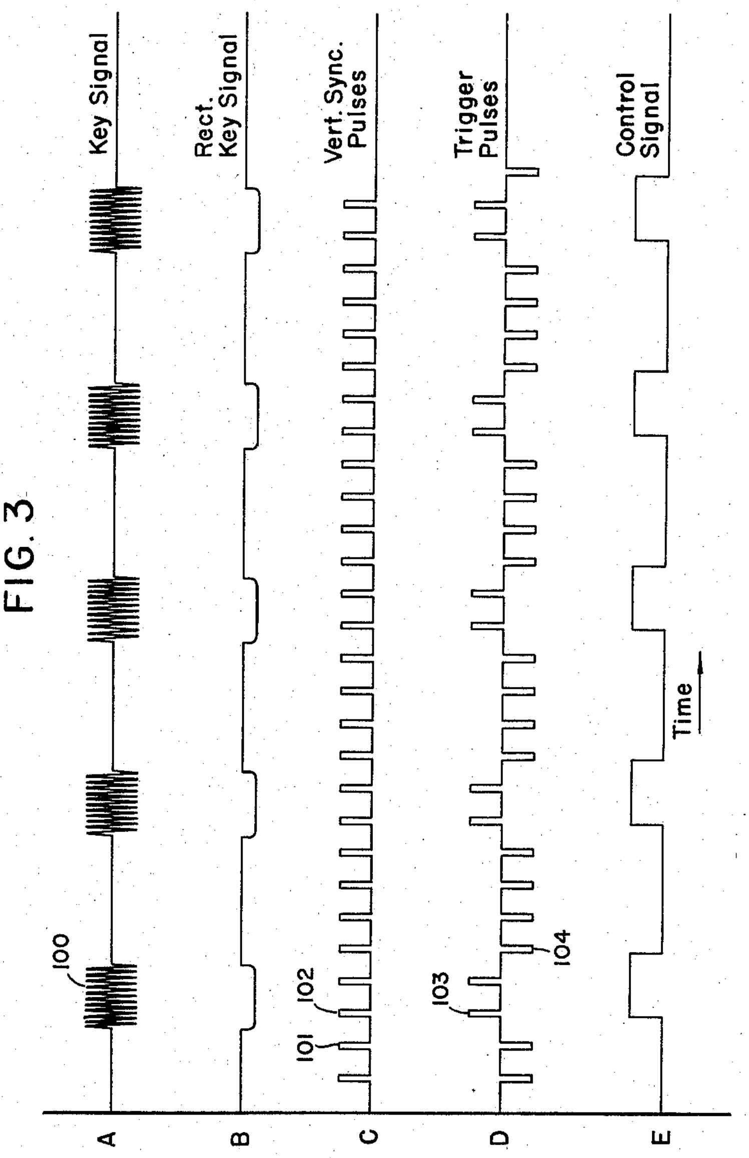
Figure 3 comprises a family of curves utilized in explaining the operation of the control circuit of Figure 2.

The operation of the control system illustrated in Figure 2 may best be understood by reference to the curves of Figure 3. Bursts of key signal, such as are indicated by the curve 3A, are received from line circuit 26 and are impressed across terminals 40. As previously stated, these bursts indicate the time intervals during which the timing of the video-signal components of the transmitted television signal is to be altered with respect to the synchronizing components thereof. As pointed out in the aforementioned Roschke patent, the changes from the normal mode to the altered mode of transmission preferably are effected during vertical-retrace intervals to avoid distorting the television image. As also pointed out in the aforementioned Roschke patent, each burst of key signal preferably is transmitted over the line circuit one field period before the corresponding change in mode to allow for delays that may occur in this circuit.

In such a system, the encoding mechanism which may be used at either the transmitter or receiver must be arranged to receive these bursts in such a manner as to enable the vertical-synchronizing pulses succeeding the initiation of each of these bursts to actuate the mechanism from a first to a second condition, and the vertical-synchronizing pulses succeeding the termination of each of these bursts to actuate the encoding mechanism from the second position back to the first. With this arrangement, mode changes are effected at the transmitter and the various subscriber receivers in synchronism.

The bursts of key signal shown in curve 3A, which are impressed across terminals 40, are amplified by the circuit of electron-discharge device 45, which acts as a well-known amplifier. This circuit is made regenerative by virtue of the connections of transformer 58 and resistor 48 which act to supply a portion of the output signal of device 45 back to control electrode 44 in proper phase to provide such regeneration. To prevent noise signals and the like from affecting the encoding apparatus, the amplifier is made to respond only to signals above a certain threshold by reason of a positive bias of cathode 49 due to the potentiometer arrangement of resistors 53 and 50. The amplified key-signal bursts from device 45 are rectified in rectifying device 56 and negative-polarity pulses represented in curve 3B appear across resistor 66.

The vertical-synchronizing pulses derived from generator 17 of Figure 1 are shown in curve 3C, and these pulses are impressed across terminals 70. The burst 100 of key signal shown in curve 3A is initiated by a vertical-synchronizing pulse corresponding to the pulse 101 of curve 3C. Due to the possibilities of a time delay occurring in line circuit 26, the burst 100, when received by a subscriber receiver, may have shifted along the axis in relation to the initiating pulse 101 which is received by air. However, as previously stated, the key-signal bursts are transmitted a field period before a change in the transmitter from one mode to the other is accomplished. Hence, such change in mode preferably is made at the transmitter by the vertical-synchronizing pulse corresponding to the pulse 102.

Therefore, the encoding mechanisms at the transmitter and at the various receivers are arranged so that mode changes are initiated by the vertical-synchronizing pulse 102. To this end, the rectified negative-polarity bursts of key signal shown in curve 3B are impressed on signal grid 64 of control device 63, and the positive-polarity vertical-synchronizing pulses (Figure 3C) from terminals 70 are also impressed on this signal grid. Control device 63 is arranged to have an amplification factor or stage gain of 2, and its characteristics are such that in the presence of each rectified burst of key signal of curve 3B the device is non-conductive and the vertical-synchronizing pulses are not translated by device 63. However, in the spaced time intervals between the intervals of rectified bursts of key signal, control device 63 is conductive and the positive-polarity vertical-synchronizing pulses applied to signal grid 64 are amplified by this device and supplied to control electrode 76 of device 77 as negative-polarity pulses of twice their original amplitude. However, the positive-polarity vertical-synchronizing pulses are continuously supplied to the output circuit of control device 63 and hence to device 77 by means of the circuit including resistor 73 and capacitor 74. Therefore, the end result is that the pulses supplied to control electrode 76 of device 77 change polarity after the initiation and after the termination of each rectified burst, such pulses being shown in curve 3D.

Since devices 77 and 85 are connected to constitute a conventional multivibrator circuit, they are rendered conductive in alternation in response to polarity change of the applied pulses. Specifically, assuming that in the initial state device 85 is conductive and device 77 is non-conductive, the multivibrator is maintained in this initial state until a positive-polarity pulse, such as the pulse 103 of curve 3D, triggers the multivibrator into its alternate operating state. Positive pulses immediately succeeding pulse 103 have no effect on the multivibrator, but the next negative pulse, such as the pulse 104 of curve 3D, acts to return the multivibrator to its initial state.

Therefore, a control signal such as shown in curve 3E is obtained across resistors 91, 92 and 93 and hence across terminals 95, the amplitude of this control signal being adjustable by means of variable tap 96. This control signal has amplitude changes determined by the vertical-synchronizing pulses immediately succeeding the initiation and termination of the individual bursts of key signal received from line circuit 26.

The multivibrator, therefore, develops a signal across output terminals 95 having positive-pulse components determined by the key signal applied to terminals 40.

However, each pulse component of the output signal is initiated by the vertical-synchronizing pulse following the beginning of each burst of key signal and is terminated by the vertical-synchronizing pulse following the ending of each key-signal burst. Thus, a series of key-signal bursts applied across input terminals 40 produces an output signal having a corresponding series of positive-pulse components across output terminals 95 but with each pulse component displaced a selected amount from the corresponding bursts as required for the proper operation of the control system in the transmitter of Figure 1.

The control circuit of this invention has proved to be highly stable in operation and has been used to advantage in subscription television systems of the type described herein. Of course, the circuit is not limited in use to subscription transmitters; it may be used in subscriber receivers to control decoding apparatus therein in time coincidence with the actuation of the coding apparatus at the transmitter.

While a particular embodiment of the invention has been shown and described, modifications may be made, and it is intended in the appended claims to cover all such modifications as may fall within the true spirit and scope of the invention.

I claim:

1. In a subscription television system a control circuit for reversing the polarity of applied periodic signal components during a first group of spaced time intervals and for translating said periodic components with unchanged polarity during a second group of spaced time intervals, as determined by an applied control signal, said control circuit comprising: an electron-discharge device having an amplification factor of 2 and including an anode, a cathode and a signal grid; an output circuit coupled to said anode; an input circuit coupled to said signal grid; means for rendering said device normally conductive to translate said periodic components; means for applying said control signal to said input circuit with negative polarity to render said electron-discharge device non-conductive during said second group of intervals; and means for simultaneously applying said periodic components with positive polarity to said input circuit and to said output circuit so that said components appear at said output circuit with a positive polarity and with a certain amplitude in response to coincidence of said control signal and said periodic components and with a negative polarity and with said certain amplitude in response to the presence of said periodic signal components alone.

2. A control system for actuating the encoding mechanism of a subscription television system under the conjoint control of a key signal representing the coding schedule of a coded program signal and periodic signal components representing a timing characteristic of said program signal, said control system comprising: a trigger circuit having first and second operating conditions; a control device having an output circuit coupled to said trigger circuit and having an input circuit; means for conditioning said control device normally to translate said periodic components; means for applying said key signal to said input circuit with such polarity as to tend to render said control device non-conductive; and means for simultaneously applying said periodic components in like phase to said input circuit and to said output circuit to effect actuation of said trigger circuit from its first operating condition to its second operating condition in response to coincidence of said key signal and said periodic components and to effect actuation of said trigger circuit from its second operating condition to its first operating condition in response to the presence of said periodic signal components alone.

3. A control system for actuating the encoding mechanism of a subscription television system under the conjoint control of a key signal representing the coding schedule of a coded program signal and periodic signal components representing a timing characteristic of said program signal, said control system comprising: a trigger circuit having first and second operating conditions; an electron-discharge device including an anode, a cathode and a signal grid; an output circuit coupling said anode to said trigger circuit; an input circuit coupled to said signal grid; means for biasing said device normally to translate said periodic components; means for applying said key signal to said input circuit with such polarity as to tend to render said electron-discharge device non-conductive; and means for simultaneously applying said periodic components in like phase to said input circuit and to said output circuit to effect actuation of said trigger circuit from its first operating condition to its second operating condition in response to coincidence of said key signal and said periodic components and to effect actuation of said trigger circuit from its second operating condition to its first operating condition in response to the presence of said periodic signal components alone.

4. A control system for actuating the encoding mechanism of a subscription television system under the conjoint control of a key signal representing the coding schedule of a coded program signal and periodic signal components representing a timing characteristic of said program signal, said control system comprising: a trigger circuit having first and second operating conditions; an electron-discharge device including an anode, a cathode and a signal grid; an output circuit coupling said anode to said trigger circuit; an input circuit coupled to said signal grid; means for biasing said device normally to translate said periodic components; means for applying said key signal to said input circuit with negative polarity to render said device con-conductive; and means for simultaneously applying said periodic components with positive polarity to said input circuit and to said output circuit to effect actuation of said trigger circuit from its first operating condition to its second operating condition in response to coincidence of said key signal and said periodic components and to effect actuation of said trigger circuit from its second operating condition to its first operating condition in response to the presence of said periodic signal components alone.

5. In a subscription television system, a control circuit comprising: a pair of common input terminals; a common load circuit; a first signal-translating channel coupling said input terminals to said common load circuit; a second signal-translating channel, including a series-connected phase-inverting amplifier, coupling said input terminals to said common load circuit and having an amplification different than that of said first channel; a control signal source for providing a control signal having a series of components representing a first group of spaced time intervals separated by a second group of intervening time intervals; means coupling said control signal source only to said second channel for applying said control signal to said phase-inverting amplifier to render said second channel conductive during one of said groups of time intervals and non-conductive during the other of said groups of time intervals; a pulse signal source for providing a plurality of signal pulses, only some of which occur in time coincidence with components of said control signal; and means coupling said pulse signal source to said input terminals for applying said signal pulses simultaneously in like phase to both of said channels to develop in said load circuit an output signal having pulse components of one polarity in response to coincidence of components of said control signal and said signal pulses and of opposite polarity in response to the presence of said signal pulses alone.

6. In a subscription television system, a control circuit comprising: a pair of common input terminals; a common load circuit; a first continuously conductive signal-translating channel coupling said input terminals to said common load circuit; a second signal-translating channel, including a series-connected normally non-conductive phase-inverting amplifier, coupling said input terminals to said common load circuit and having an amplification twice that of said first channel; a control signal source for providing a control signal having a series of components representing a first group of spaced time intervals separated by a second group of intervening time intervals; means coupling said control signal source only to said second channel for applying said control signal to said phase-inverting amplifier to render said second channel nonconductive during said first group of time intervals; a pulse signal source for providing periodically recurring signal pulses, only some of which occur in time coincidence with said components of said control signal; and means coupling said pulse signal source to said input terminals for applying said signal pulses simultaneously in like phase to both of said channels to develop in said load circuit an output signal having pulse components of one polarity and with a certain amplitude in response to coincidence of components of said control signal and said signal pulses and of opposite polarity and with said same certain amplitude in response to the presence of said signal pulses alone.

References Cited in the file of this patent

UNITED STATES PATENTS

| | | |
|---|---|---|
| 2,487,682 | Wendt | Nov. 8, 1949 |
| 2,573,446 | Ingalls | Oct. 30, 1951 |
| 2,601,492 | Baker | June 24, 1952 |
| 2,605,410 | Friend | July 29, 1952 |
| 2,645,713 | Pritchard | July 14, 1953 |
| 2,656,406 | Gray et al. | Oct. 20, 1953 |